US006527874B2

(12) United States Patent
Li

(10) Patent No.: US 6,527,874 B2
(45) Date of Patent: Mar. 4, 2003

(54) RARE EARTH MAGNET AND METHOD FOR MAKING SAME

(75) Inventor: Gang Li, Settsu (JP)

(73) Assignee: Sumitomo Special Metals Co., Ltd. (JP)

( * ) Notice: Subject to any disclaimer, the term of this patent is extended or adjusted under 35 U.S.C. 154(b) by 0 days.

(21) Appl. No.: 09/901,104

(22) Filed: Jul. 10, 2001

(65) Prior Publication Data

US 2002/0017338 A1 Feb. 14, 2002

(30) Foreign Application Priority Data

Jul. 10, 2000 (JP) ........................................ 2000-207675

(51) Int. Cl.⁷ .......................... H01F 1/053; H01F 1/057; H01F 1/058
(52) U.S. Cl. ........................ 148/301; 148/302; 148/101
(58) Field of Search ................................ 148/301, 302, 148/101, 102, 103

(56) References Cited

U.S. PATENT DOCUMENTS

| | | | |
|---|---|---|---|
| 4,770,723 A | | 9/1988 | Sagawa et al. |
| 4,952,239 A | * | 8/1990 | Tokunaga et al. ........... 148/302 |
| 4,995,905 A | | 2/1991 | Sagawa |
| 5,000,800 A | | 3/1991 | Sagawa |
| 5,100,485 A | * | 3/1992 | Yamashita et al. ........... 148/101 |
| 5,292,380 A | * | 3/1994 | Tanigawa et al. ........... 148/302 |
| 5,447,275 A | | 9/1995 | Goka et al. |
| 5,725,792 A | * | 3/1998 | Panchanathan .............. 148/104 |
| 5,997,804 A | * | 12/1999 | Uchida et al. ................ 148/103 |
| 6,004,407 A | * | 12/1999 | Kojima et al. ............... 148/302 |
| 2001/0039980 A1 | * | 11/2001 | Arai et al. ................... 148/301 |
| 2002/0007874 A1 | * | 1/2002 | Arai et al. ................... 148/302 |
| 2002/0036032 A1 | * | 3/2002 | Arai et al. ................... 148/302 |

FOREIGN PATENT DOCUMENTS

| | | |
|---|---|---|
| EP | 0 344 542 | 12/1989 |
| EP | 0 633 581 | 1/1995 |
| JP | 60-254708 | 12/1985 |
| JP | 07-018366 | 1/1995 |
| JP | 07-094311 | 4/1995 |

OTHER PUBLICATIONS

Hamano et al. "Magnetic Properties of Amorphous–Phase Remaining alphaFe/NdFeB Nanocomposite", Rare Earth Magnets and Their Applications, vol. 1, Proceedings of the Fifteenth International Rare Earth magnets and Their Applications, Aug. 30–Sep. 3, 1998, pp. 199–204.*

* cited by examiner

Primary Examiner—John Sheehan
(74) Attorney, Agent, or Firm—Nixon Peabody LLP

(57) ABSTRACT

A rapidly solidified alloy is produced by quenching and solidifying a melt of an alloy having a general formula represented by $(Fe_{1-m}T_m)_{100-x-y-z}Q_xR_yM_z$ where T denotes at least one kind of element selected from the group consisting of Co and Ni, Q denotes at least one kind of element selected from the group consisting of B and C, R denotes at least one kind of rare earth element, and M denotes at least one kind of element selected from the group consisting of Nb and Mo, and the mole fractions x, y, z, and m respectively satisfy $2 \leq x \leq 28$ (atom %), $8 \leq y \leq 30$ (atom %), $0.1 \leq z < 1.0$ (atom %), and $0 \leq m \leq 0.5$ (atom %). The rapidly solidified alloy is then pulverized and sintered to manufacture a rare earth permanent magnet. The cooling rate is controlled to be in the range of $10^2$ K/sec to $10^4$ K/sec, so that the alloy structure is uniformly fine and the added element M is uniformly dispersed.

8 Claims, 3 Drawing Sheets

RARE EARTH MAGNET AND METHOD FOR MAKING SAME

BACKGROUND OF THE INVENTION

1. Field of the Invention

The present invention relates to a rare earth magnet and a method for manufacturing the same.

2. Discussion of Related Art

Conventionally, in the manufacture of R—Fe—B rare earth sintered magnets, it has been proposed to add Niobium (Nb) to an alloy material for the purpose of obtaining finer crystal grains in the sintered bodies and improving the heat resistance of the magnets. Nb is known to suppress crystal grains from becoming coarse during sintering and to improve the magnetization properties of the magnet.

Japanese Laid-Open Patent Publication No. 7-94311 discloses a technique for improving the magnetic properties and the heat resistance of Nd—Fe—Co—B sintered magnets by adding 0.1 to 2.0 wt % of Nb.

Japanese Patent Publication for Opposition No. 6-69003 discloses that the magnetic properties such as coercive force can be improved by adding 1 to 10 atom % (atomic percentage) of a metal element, for example Ti, Zr, Hf, Nb, in the production of rare earth magnet alloys by a quenching method.

The above conventional techniques have the following problems. In the technique disclosed in Japanese Laid-Open Patent Publication No. 7-94311, the alloy is produced by ingot casting. Therefore, the cooling rate of the alloy melt is low. At such a low cooling rate, a nonmagnetic boride such as $NbFeB_2$ tends to be produced in a coarse grain state. If such coarse nonmagnetic boride is produced, the resultant rare earth magnet is hardened after sintering. This greatly deteriorates the efficiency of subsequent machining of the magnet, such as by cutting and surface polishing.

In the technique disclosed in Japanese Patent Publication for Opposition No. 6-69003, a large amount of the Nb metal is added which also results in a nonmagnetic boride, such as $NbFeB_2$, being produced. As a result, the remanence or residual flux density $B_r$ of the rare earth magnet decreases after sintering, and the processing efficiency of the magnet deteriorates.

SUMMARY OF THE INVENTION

A main object of the present invention is to provide a rare earth magnet superior in terms of both permanent magnetic properties and processability, and to provide a method for manufacturing such a rare earth magnet.

The rapidly solidified alloy of the present invention has a general formula represented by $(Fe_{1-m}T_m)_{100-x-y-z}Q_xR_yM_z$ where T denotes at least one element selected from the group consisting of Co and Ni, Q denotes at least one element selected from the group consisting of B and C, R denotes at least one rare earth element, and M denotes at least one kind of element selected from the group consisting of Nb and Mo, and the mole fractions x, y, z, and m respectively satisfy $2 \leq x \leq 28$ (atom %), $8 \leq y \leq 30$ (atom %), $0.1 \leq z < 1.0$ (atom %), and $0 \leq m \leq 0.5$ (atom %).

Preferably, the cooling rate at which the alloy material melt is quenched is in the range of $10^2$ K/sec to $10^4$ K/sec in order to rapidly solidify the alloy.

In a preferred embodiment, Niobium is present as an essential element.

In another preferred embodiment, the alloy includes an $R_2Fe_{14}B$ compound in which the crystal grains have a minor-axis size in a range between 0.1 μm and 100 μm, a major-axis size in a range between 5 μm and 500 μm; and an R-rich phase dispersed at the grain boundaries of the crystal grains, the alloy has a thickness in a range between 0.03 mm and 10 mm.

The rare earth magnet of the present invention is then manufactured from any of the rapidly solidified alloys described above.

Additionally, the rare earth magnet of the present invention is manufactured from a rapidly solidified alloy to which Nb and/or Mo have been added in an amount in a range between 0.1 atom % and 1.0 atom %.

The method for manufacturing a rare earth magnet of the present invention includes the steps of:

producing a rapidly solidified alloy by quenching and solidifying a melt of an alloy having a general formula represented by $(Fe_{1-m}T_m)_{100-x-y-z}Q_xR_yM_z$ where T denotes at least one kind of element selected from the group consisting of Co and Ni, Q denotes at least one kind of element selected from the group consisting of B and C, R denotes at least one kind of rare earth element, and M denotes at least one kind of element selected from the group consisting of Nb and Mo, and the mole fractions x, y, z, and the mole fractions x, y, z, and m respectively satisfy $2 \leq x \leq 28$ (atom %), $8 \leq y \leq 30$ (atom %), $0.1 \leq z < 1.0$ (atom %), and $0 \leq m \leq 0.5$ (atom %); and manufacturing a permanent magnet from the rapidly solidified alloy.

Preferably, in the step of producing a rapidly solidified alloy, the cooling rate is in a range between $10^2$ K/sec to $10^4$ K/sec.

In another preferred embodiment, the step of producing a rapidly solidified alloy is performed by strip casting a melt of the alloy.

In still another preferred embodiment, the method further includes the step of embrittling the rapidly solidified alloy by allowing the rapidly solidified alloy to occlude hydrogen and then release the hydrogen.

DETAILED DESCRIPTION OF THE INVENTION

Figure 1:
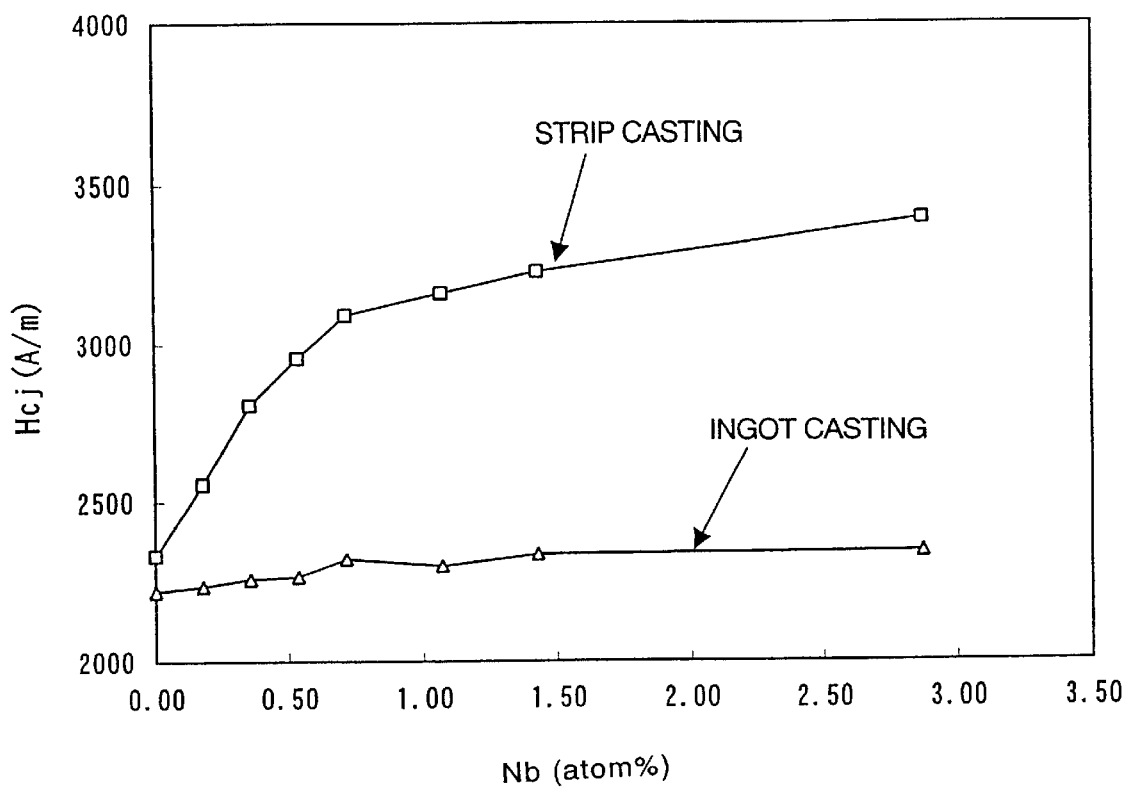
FIG. 1 is a graph illustrating the dependence of the coercive force $H_{cj}$ on the Niobium content of the alloy (atom %) for a process of the present invention (strip casting) and as well as for a comparative example (ingot casting).

The present invention is based upon the discovery that in the production of a rapidly solidified rare earth alloy sintered magnet, by quenching a melt of an alloy material at a cooling rate of $10^2$ to $10^4$ K/sec, the addition of a slight amount of Nb and/or Mo (less than 1.0 atom % of the entire alloy) to the alloy results in the additive being dispersed uniformly in the alloy structure. As a result, with addition of only such a small amount of Nb and/or Mo, it is possible to increase the coercive force and improve the squareness of a demagnetization curve, while suppressing the conventional problems of a reduction in remanence and a deterioration in the processability of the sintered magnet due to production of borides.

In the conventional ingot casting to produce a rare earth magnet, it was considered necessary to add a comparatively large amount of Nb or the like to a rare earth alloy in order to increase the coercive force. However, in the manufacture of a rapidly solidified rare earth alloy by strip casting, it was found that when Nb was added in an amount considered necessary, the hardness of the finally produced sintered magnet significantly increased, and as a result machining, such as by surface polishing or cutting, of the sintered magnet became remarkably difficult.

To correct the above problem, the amount of Nb or the like to be added to the rapidly cooled alloy was reduced from the amount considered conventionally necessary. The resultant magnet exhibited a marked increase in coercive force when compared with a magnet produced by ingot casting, and the resultant magnet succeeded in minimizing both the reduction in remanence and the deterioration in processability.

It is not fully understood why the optimum amount of Nb and/or Mo added to a rare earth alloy depends significantly on the cooling rate of an alloy melt as described above. However, it is presumed to be due to the alloy grain structure being made fine by quenching the alloy at a cooling rate in a defined. As a consequence the effect of the addition of Nb or the like is that the additive is dispersed uniformly even though the amount added is small.

According to the present invention, a melt of a material alloy is prepared in which the general formula is represented by $(Fe_{1-m}T_m)_{100-x-y-z}Q_xR_yM_z$ where T denotes at least one kind of element selected from Co and Ni, Q denotes at least one kind of element selected from B and C, R denotes at least one kind of rare earth element, and M denotes at least one kind of element selected from Nb and Mo. The mole fractions x, y, z, and m respectively satisfy $2 \leq x \leq 28$ (atom %), $8 \leq y \leq 30$ (atom %), $0.1 \leq z < 1.0$ (atom %), and $0 \leq m \leq 0.5$ (atom %).

To improve the coercive force, the alloy preferably contains Dy and/or Tb in an amount of 1.0 atom % or more. A melt of the alloy to which Nb and/or Mo have been added as described above is quenched and solidified using a melt quenching apparatus such as a known strip casting apparatus. According to the present invention, the cooling rate at this quenching is controlled to be in the range of $1.0 \times 10^2$ K/sec to $1.0 \times 10^4$ K/sec. This cooling rate is achieved during the period from the time at which the alloy melt comes into contact with the surface of a chill roll until the time at which the temperature of the alloy drops to about 500 degrees Centigrade. The cooling rate is more preferably in the range of $2 \times 10^2$ K/sec to $1 \times 10^3$ K/sec, and more preferably in the range of $3 \times 10^2$ K/sec to $6 \times 10^2$ K/sec.

The amount of Nb and/or Mo is preferably in the range of $0.1 \leq z < 1.0$ (atom %), more preferably in the range of $0.20 \leq z < 0.95$ (atom %), and further more preferably in the range of $0.35 \leq z < 0.75$ (atom %), as was determined from the results of the experiments described later.

An embodiment of the method of manufacturing a rare earth magnet of the present invention will be described below in detail.

Initially, a melt of a R—Fe—B alloy is prepared which contains R (at least one kind from the rare earth elements including Y): 8 to 30 atom %, B: 2 to 28 atom %, Nb: 0.1 to 1.0 atom %, and Fe as the remainder, together with inevitable impurities. Either Co and/or Ni may be substituted for part of the Fe content, and C may be substituted for part of the B content. It is also possible to substitute Si, P, and/or S for part of the B content.

The alloy melt (molten alloy) is then cooled and solidified, at a cooling rate of $10^2$ to $10^4$ K/sec by strip casting, into the shape of thin plates having a thickness of 0.03 mm to 10 mm to form cast pieces having a structure composed essentially of a major phase of a $R_2Fe_{14}B$ tetragonal compound and a R-rich phase separated into portions having a fine size of 5 μm or less. The cast pieces are stored in a vessel equipped with air intake and exhaust facilities. The vessel is evacuated, and the $H_2$ gas with a pressure of 0.03 MPa to 1.0 MPa is fed into the vessel, to form disintegrated alloy powder. After being dehydrogenated, the disintegrated alloy powder is preferably finely pulverized under inert gas flow.

The cast pieces, which are used in the present invention, can be produced by quenching an alloy melt using a single roll method or a twin roll method of strip casting. The single roll method or the twin roll method can be selected depending on the thickness of the cast pieces to be produced. The twin roll method is preferably employed for thick cast pieces; while the single roll method is preferably employed for thin cast pieces.

If the thickness of the cast pieces is less than 0.03 mm, the quenching effect is so great that the crystal grain size may possibly be too small. If the crystal grain size is too small, the grains are individually polycrystallized when the cast pieces are powdered which results in a failure to align the crystal orientation and thus deterioration in magnetic properties. If the thickness of the cast pieces exceeds 10 mm, the cooling rate decreases, resulting in the a Fe phase being easily precipitated in large amounts and the Nb-rich phase being unevenly distributed. A more preferable thickness range of the strip cast pieces is 0.1 mm to 5 mm.

The hydrogen occlusion process is performed in the following manner. The cast pieces to be pulverized to a predetermined size and are put in a material case, and the material case is then placed in a sealable hydrogen furnace, and then sealed. After sufficient evacuation of the hydrogen furnace, hydrogen gas with a pressure of 30 kPa to 1.0 Mpa is fed into the furnace, to allow the cast pieces to occlude hydrogen. The alloy cast pieces are spontaneously embrittled by the hydrogen occlusion.

The alloy embrittled by the hydrogen occlusion is cooled and then hydrogenated under vacuum. The hydrogenated alloy powder has microcracks. The powder can then be quickly finely pulverized in a subsequent pulverization with a ball mill, a jet mill, or the like. The alloy powder thus produced has the particle size of 2 to 6 μm (FSSS size). An especially preferred hydrogen pulverization process is disclosed in Japanese Laid-Open Patent Publication No. 7-18366.

The fine pulverization is preferably performed using a jet mill and an inert gas, such as $N_2$ or Ar. Alternatively, the fine pulverization can be performed using a ball mill or an attritor using an organic solvent, such as benzene or toluene.

During the above pulverization, the oxygen concentration of the inert ambient gas may be controlled at a low value (500 ppm or less) so that the amount of oxygen contained in the powder remains small.

It is preferable to add to the above alloy powder a liquid lubricant containing fatty ester or the like as a main ingredient. The lubricant can be added in an amount of 0.15 to 5.0 mass %. The lubricant may also contain a binder. Examples of the fatty ester lubricant include methyl caproate, methyl caprylate, and methyl laurate. It is important that the lubricant selected be removable by volatilization in a subsequent process step. If the lubricant is a solid that is not easily mixed uniformly with the alloy powder, the lubricant may be diluted with a solvent. As such a solvent, a petroleum solvent such as an isoparaffin, a naphthenic solvent, and the like may be used. The lubricant may also be added before, during, or after the fine pulverization. The liquid lubricant provides the effect of protecting the powder particles from being oxidized by covering the surfaces of the particles. In addition, the liquid lubricant equalizes the density of a green compact during compaction of the powder to improve orientation of the particles in an aligning magnetic field.

Next, alignment in the magnetic field and compaction are performed with a press. The filling density of the magnetic powder is selected to be within a range (e.g., 30 to 40% of the true density) which enables the powder to be aligned in the magnetic field, After removal from the press, the green compact is subjected to known manufacturing processes including debindering, sintering, and aging, to be finally processed as a permanent magnet product.

EXAMPLES AND COMPARATIVE EXAMPLES

First, samples of flake-like alloys having the compositions shown in the upper part of Table 1, i.e., samples 1 to 8, were prepared by strip casting. The cooling rate for alloy melts in these examples were in the range of about $2 \times 10^2$ K/sec to $8 \times 10^2$ K/sec, even though the cooling rate differs between the portion of the melt in contact with the, roll and the portion of the melt on the side away from the roll. Next, samples of flake-like alloys having compositions shown in the lower part of Table 1, i.e., samples 9 to 16, were prepared.

TABLE 1

| No. | Nd | Dy | Pr | B | Nb | Fe | Br(T) | Hcj(A/m) |
|---|---|---|---|---|---|---|---|---|
| 1 | 6.88 | 4.27 | 2.82 | 6.12 | 0.00 | 79.92 | 1.128 | 2331.7 |
| 2 | 6.88 | 4.28 | 2.82 | 6.18 | 0.18 | 79.67 | 1.118 | 2555.3 |
| 3 | 6.88 | 4.28 | 2.82 | 6.31 | 0.36 | 79.36 | 1.108 | 2807.6 |
| 4 | 6.88 | 4.28 | 2.82 | 6.43 | 0.53 | 79.06 | 1.087 | 2954.8 |
| 5 | 6.89 | 4.28 | 2.82 | 6.55 | 0.71 | 78.75 | 1.053 | 3090.1 |
| 6 | 6.89 | 4.28 | 2.82 | 6.80 | 1.07 | 78.14 | 0.925 | 3157.7 |
| 7 | 6.89 | 4.28 | 2.82 | 7.05 | 1.43 | 77.53 | 0.818 | 3227.0 |
| 8 | 6.94 | 4.31 | 2.84 | 7.46 | 2.87 | 75.58 | 0.556 | 3394.1 |
| 9 | 6.88 | 4.27 | 2.82 | 6.12 | 0.00 | 79.92 | 1.175 | 2218.7 |
| 10 | 6.88 | 4.28 | 2.82 | 6.18 | 0.18 | 79.67 | 1.157 | 2234.6 |
| 11 | 6.88 | 4.28 | 2.82 | 6.31 | 0.36 | 79.36 | 1.135 | 2256.1 |
| 12 | 6.88 | 4.28 | 2.82 | 6.43 | 0.53 | 79.06 | 1.115 | 2264.1 |
| 13 | 6.89 | 4.28 | 2.82 | 6.55 | 0.71 | 78.75 | 1.098 | 2320.6 |
| 14 | 6.89 | 4.28 | 2.82 | 6.80 | 1.07 | 78.14 | 1.077 | 2297.5 |
| 15 | 6.89 | 4.28 | 2.82 | 7.05 | 1.43 | 77.53 | 1.002 | 2334.1 |
| 16 | 6.94 | 4.31 | 2.84 | 7.46 | 2.87 | 75.58 | 0.858 | 2343.6 |

In Table 1, the mole fractions of the elements are in atomic percentage (atom %). In samples 1 to 16, the added amount of Nb varies from 0.00 atom % to 2.87 atom %, but the mole fractions of the other element are substantially constant through the samples. Samples 2 to 5 represent examples of the present invention while samples 1 and 6 to 16 represent comparative examples. For reference, Table 2 below illustrates fraction in weight percentage (wt %) of the compositions of samples 1 to 16 converted from Table 1.

TABLE 2

| No. | Nd | Dy | Pr | B | Nb | Fe |
|---|---|---|---|---|---|---|
| 1 | 15.00 | 10.50 | 6.00 | 1.00 | 0.00 | 67.50 |
| 2 | 15.00 | 10.50 | 6.00 | 1.01 | 0.25 | 67.24 |
| 3 | 15.00 | 10.50 | 6.00 | 1.03 | 0.50 | 66.97 |
| 4 | 15.00 | 10.50 | 6.00 | 1.05 | 0.75 | 66.70 |
| 5 | 15.00 | 10.50 | 6.00 | 1.07 | 1.00 | 66.43 |
| 6 | 15.00 | 10.50 | 6.00 | 1.11 | 1.50 | 65.89 |
| 7 | 15.00 | 10.50 | 6.00 | 1.15 | 2.00 | 65.35 |
| 8 | 15.00 | 10.50 | 6.00 | 1.21 | 4.00 | 63.29 |
| 9 | 15.00 | 10.50 | 6.00 | 1.00 | 0.00 | 67.50 |
| 10 | 15.00 | 10.50 | 6.00 | 1.01 | 0.25 | 67.24 |
| 11 | 15.00 | 10.50 | 6.00 | 1.03 | 0.50 | 66.97 |
| 12 | 15.00 | 10.50 | 6.00 | 1.05 | 0.75 | 66.70 |
| 13 | 15.00 | 10.50 | 6.00 | 1.07 | 1.00 | 66.43 |
| 14 | 15.00 | 10.50 | 6.00 | 1.11 | 1.50 | 65.89 |
| 15 | 15.00 | 10.50 | 6.00 | 1.15 | 2.00 | 65.35 |
| 16 | 15.00 | 10.50 | 6.00 | 1.21 | 4.00 | 63.29 |

The quenched alloys having the compositions shown in Tables 1 and 2 were embrittled (roughly pulverized) by hydrogen occlusion, and then finely pulverized with a jet mill to obtain powder having an average particle size of about 3.5 $\mu$m (FSSS size). The resultant finely-pulverized powder was then compacted with a press to obtain green compacts, which were then sintered in a low-pressure argon atmosphere (100 Torr: about 13.3 kPa). After this sintering, sintered magnets having a size of 27 mm×52 mm×52 mm were manufactured.

Figure 2:
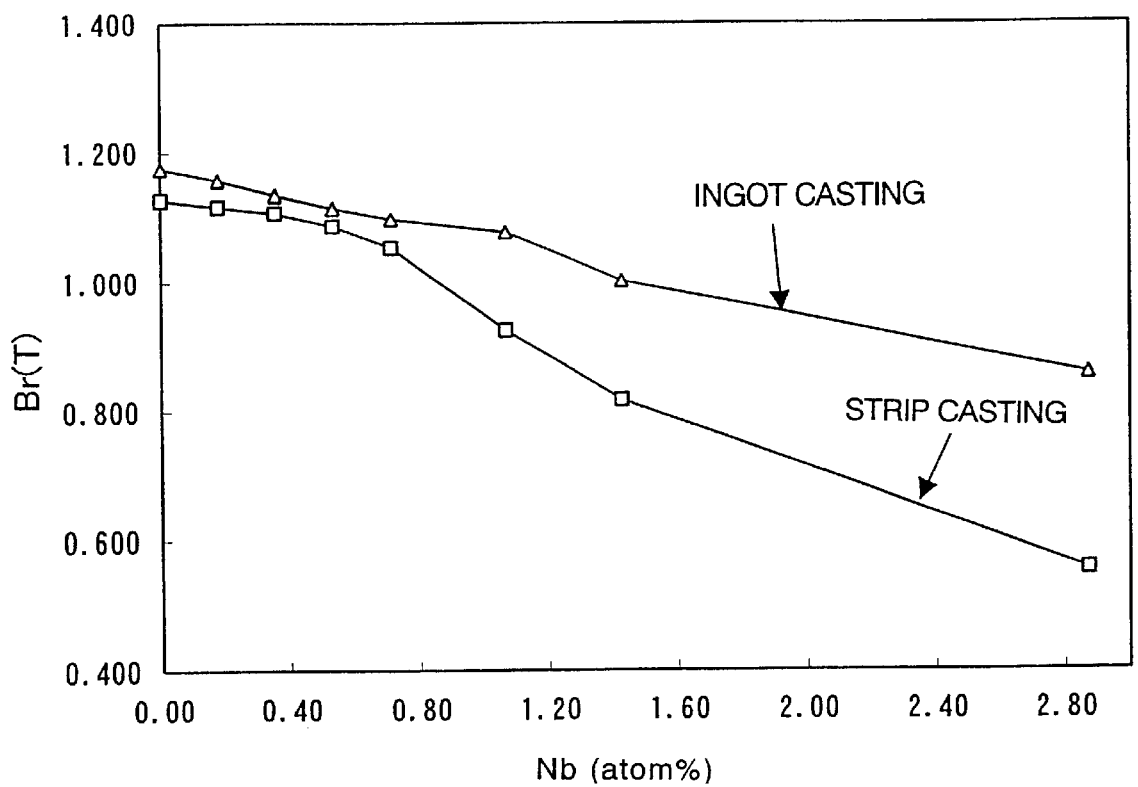
FIG. 2 is a graph illustrating the dependence of the remanence $B_r$ on the Niobium content of the alloy (atom %) for a process of the present invention (strip casting) and as well as for a comparative example (ingot casting)

Table 1 also illustrates the measurements of the coercive force $H_{cj}$ and the remanence $B_r$ obtained for the respective sintered magnets. FIGS. 1 and 2 show the dependencies of the coercive force $H_{cj}$ and the remanentce $B_r$, respectively, on the Nb amount added to the rare earth alloy. For reference, FIGS. 1 and 2 also show measurement data for the comparative examples. The comparative examples include both the samples (10 to 13) that have substantially the same compositions as those of the examples (samples 2 to 5) but were prepared by ingot casting (cooling rate of alloy melt: 5 to 40 K/sec), and the samples (1 and 6 to 8) that were prepared by strip casting but have Nb added amounts falling outside the predetermined range in accordance with the present invention.

As is apparent from FIG. 1, in the strip casting, the effect of increasing the coercive force by addition of Nb was significant. More specifically, the coercive force exhibited a sharp increase when the Nb was added in the range of 0.1 to 1.0 atom %, and this increase began leveling off when the Nb was added above 1.0 atom %. It was also confirmed that the heat resistance of the magnet improved with addition of Nb. In contrast, FIG. 1 illustrates that in the ingot casting process an increase in the coercive force through the addition of Nb was only modestly achieved.

As is apparent form FIG. 2, the remanence $B_r$ decreased as increasing amounts of the Nb were added regardless of the method of cooling the alloy melt.

Figure 3:
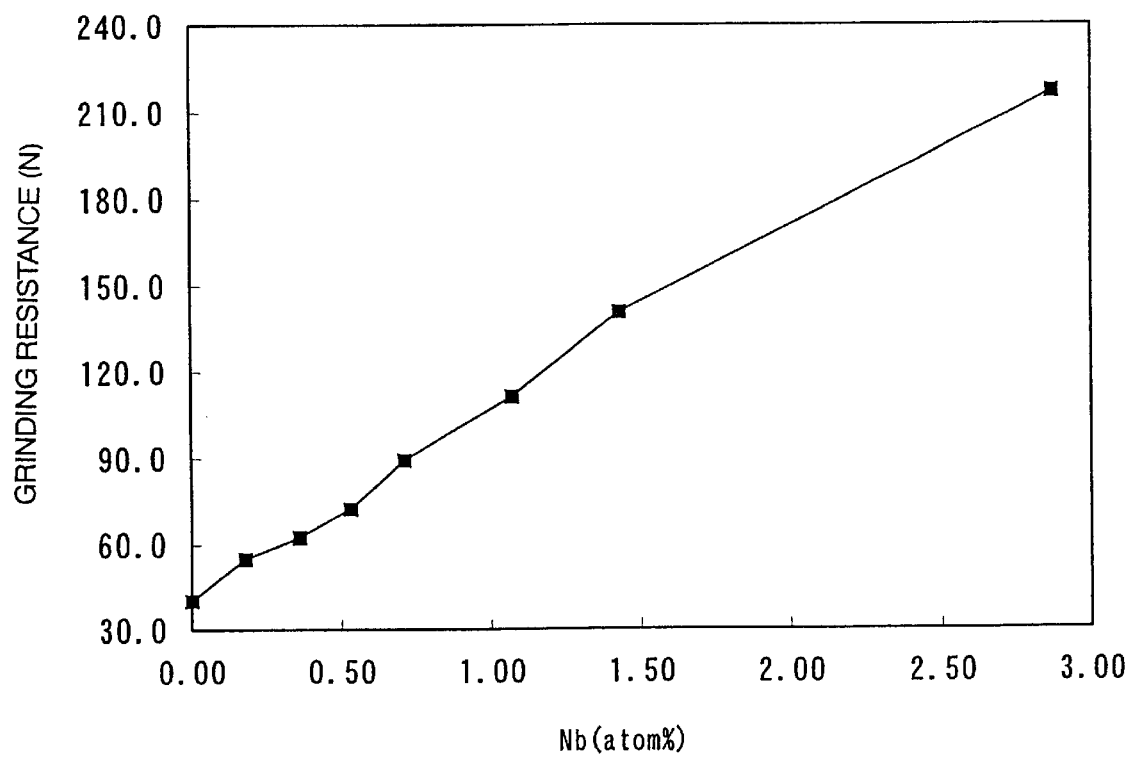
FIG. 3 is a graph illustrating the dependence of the grinding resistance (N: newton) on the Niobium content of the alloy (atom %) for a process of the present invention (strip casting).

FIG. 3 illustrates the relationship between the grinding resistance and the amount of Nb in a sintered magnet manufactured from the powder of a quenched alloy manufactured by strip casting. The grinding resistance was calculated from a load current at a motor driving a cutting blade. As is seen in FIG. 3, the grinding resistance increased steadily with an increase in the Nb amount. This indicates that the sintered magnet is hardened, and therefore, the processability deteriorates with the addition of Nb.

From the above results, it was found that the amount of Nb to be added to the material alloy is preferably 0.1 atom % to less than 1.0 atom %. If Nb is added in an amount of more than 1.0 atom %, production of a boride of Nb becomes significant, which causes problems such as reduction in saturation magnetization and a deterioration in the processability of the magnet. If Nb is added in an amount of less than 0.1 atom %, this is also undesirable due to an insufficient increase in the coercive force. The Nb is added preferably from 0.20 atom % and to less than 0.95 atom %, and more e preferably from 0.35 atom % and to less than 0.75 atom %.

As the M element, V and Zr may also be used in place of or in addition to Nb and Mo. Since the addition of V and/or Zr make magnetic properties of the magnets be unstable, Nb and Mo are more preferable than V and Zr.

According to the present invention, Nb and Mo are uniformly dispersed in a fine structure of a quenched alloy. Therefore, even a small added amount (0.1 atom % or more and less than 1.0 atom %) of Nb and Mo can be effective in suppressing grain growth during sintering. As a result, it is possible to increase the coercive force and moreover improve the squareness of a demagnetization curve, while minimally reducing the remanence and minimally deteriorating the processability of the resultant rare earth sintered magnet.

While the present invention has been described in terms of preferred embodiments, it is apparent to those skilled in the art that the disclosed invention may be modified in numerous ways and may assume many embodiments other than those specifically set forth and described above. Accordingly, the appended claims cover all modifications of the invention that fall within the scope of the invention.

What is claimed is:

1. A rapidly solidified alloy sintered magnet having a general formula represented by $(Fe_{1-m}T_m)_{100-x-y-z}Q_xR_yM_z$ where T denotes at least one element selected from the group consisting of Co and Ni, Q denotes at least one element selected from the group consisting of B and C, R denotes at least one rare earth element, and M denotes Nb, and the mole fractions x, y, z, and m respectively satisfy $2 \leq x \leq 28$ (atom %), $8 \leq y \leq 30$ (atom %), $0.1 \leq z < 1.0$ (atom %), and $0 \leq m \leq 0.5$ (atom %).

2. The rapidly solidified alloy sintered magnet of claim 1, wherein the cooling rate at which a melt of a material rare earth alloy is quenched to produce the rapidly solidified alloy is in a range of $10^2$ K/sec to $10^4$ K/sec.

3. The rapidly solidified alloy sintered magnet of claim 1, wherein the alloy includes: $R_2F_{14}B$ compound crystal grains having a minor-axis size in a range between 0.1 $\mu$m and 10 $\mu$m and a major-axis size in a range between 5 $\mu$m and 500 $\mu$m; and a R-rich phase exists uniformly at the grain boundaries of the crystal grains, the alloy having a thickness in a range between 0.03 mm and 10 mm.

4. A method for manufacturing a rare earth sintered magnet, comprising the steps of:

producing a rapidly solidified alloy by quenching and solidifying a melt of an alloy having a general formula represented by $(Fe_{1-m}T_m)_{100-x-y-z}Q_xR_yM_z$ where T denotes at least one element selected from the group consisting of Co and Ni, Q denotes at least one element selected from the group consisting of B and C, R denotes at least one rare earth element, and M denotes Nb, and the mole fractions x, y, z, and m respectively satisfy $2 \leq x \leq 28$ (atom %), $8 \leq y \leq 30$ (atom %), $0.1 \leq z < 1.0$ (atom %), and $0 \leq m \leq 0.5$ (atom %);

producing a powder of the rapidly solidified alloy, and manufacturing a permanent magnet by sintering the powder of the rapidly solidified alloy.

5. The method of claim 4, wherein in the step of producing a rapidly solidified alloy the cooling rate is from $10^2$ K/sec to $10^4$ K/sec.

6. The method of claim 5, wherein in the step of producing a rapidly solidified alloy the melt of the alloy is quenched by strip casting.

7. The method of any one of claims 4 to 6, further comprising the step of embrittling the rapidly solidified alloy by allowing the rapidly solidified alloy to occlude hydrogen and then release the hydrogen.

8. The method of claim 4, further comprising the step of grinding the permanent magnet.

* * * * *